(12) United States Patent
Dubail et al.

(10) Patent No.: US 11,327,342 B2
(45) Date of Patent: May 10, 2022

(54) OPTICAL LENS FOR CORRECTING COLOR VISION

(71) Applicant: Essilor International, Charenton-le-Pont (FR)

(72) Inventors: Marie Dubail, Charenton-le-Pont (FR); Montserrat Burgos, Charenton-le-Pont (FR); Charlène Pousse, Charenton-le-Pont (FR); Michèle Thomas, Charenton-le-Pont (FR); Xiaohong Zhang, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 201 days.

(21) Appl. No.: 16/647,810

(22) PCT Filed: Sep. 19, 2018

(86) PCT No.: PCT/EP2018/075318
§ 371 (c)(1),
(2) Date: Mar. 16, 2020

(87) PCT Pub. No.: WO2019/057752
PCT Pub. Date: Mar. 28, 2019

(65) Prior Publication Data
US 2020/0218089 A1 Jul. 9, 2020

(30) Foreign Application Priority Data
Sep. 19, 2017 (EP) .................................... 17306218

(51) Int. Cl.
*G02C 7/10* (2006.01)
*G02C 7/02* (2006.01)

(52) U.S. Cl.
CPC ............... *G02C 7/104* (2013.01); *G02C 7/02* (2013.01)

(58) Field of Classification Search
CPC ................................. G02C 7/104; G02C 7/02
See application file for complete search history.

(56) References Cited

U.S. PATENT DOCUMENTS

| 4,211,823 A | 7/1980 | Suzuki et al. |
| 5,922,246 A | 7/1999 | Matsushita et al. |
| 6,089,712 A | 7/2000 | Harris |
| (Continued) | | |

FOREIGN PATENT DOCUMENTS

| EP | 614957 | 9/1994 |
| EP | 1580591 | 9/2005 |
| (Continued) | | |

OTHER PUBLICATIONS

International Search Report and Written Opinion Issued in Corresponding PCT Patent Application No. PCT/EP2018/075318, dated Dec. 12, 2018.

*Primary Examiner* — Tuyen Tra
(74) *Attorney, Agent, or Firm* — Norton Rose Fulbright US LLP (57) ABSTRACT

The present invention relates to optical lens for correcting color vision for individuals with color vision deficiency comprising a substrate and an absorbing dye which has at least a minimum light transmission factor at a wavelength ranging from 515 nm to 80 nm that is lower than or equal to 40% and quickly varying transmission around 500 nm and around 595 nm.

23 Claims, 3 Drawing Sheets

(56) References Cited

U.S. PATENT DOCUMENTS

| | | | |
|---|---|---|---|
| 6,534,443 | B2 | 3/2003 | Inuzuka |
| 6,554,873 | B2 | 4/2003 | Inuzuka et al. |
| 7,736,742 | B2 * | 6/2010 | Thomas ................. G02B 1/115 |
| | | | 428/412 |
| 10,481,413 | B2 * | 11/2019 | Hofener ................... G02B 1/11 |
| 2003/0020869 | A1 | 1/2003 | Leclaire et al. |
| 2003/0165698 | A1 | 9/2003 | Vaneeckhoutte et al. |
| 2004/0075810 | A1 | 4/2004 | Duha et al. |
| 2008/0127432 | A1 | 6/2008 | Burguiere et al. |
| 2009/0047424 | A1 | 2/2009 | Momma |
| 2013/0244045 | A1 | 9/2013 | Song et al. |

FOREIGN PATENT DOCUMENTS

| | | |
|---|---|---|
| FR | 2943798 | 10/2010 |
| JP | 2000/241601 | 9/2000 |
| JP | 2000/314088 | 11/2000 |
| WO | WO 2007/088312 | 8/2007 |
| WO | WO 2009/001703 | 12/2009 |
| WO | WO 2010/109154 | 9/2010 |
| WO | WO 2011/080472 | 7/2011 |
| WO | WO 2012/076174 | 6/2012 |
| WO | WO 2012/076714 | 6/2012 |
| WO | WO 2012/119158 | 9/2012 |
| WO | WO 2012/153072 | 11/2012 |
| WO | WO 2013/098351 | 7/2013 |
| WO | WO 2016/148984 | 9/2016 |

\* cited by examiner

OPTICAL LENS FOR CORRECTING COLOR VISION

CROSS-REFERENCE TO RELATED APPLICATIONS

This application is a national phase application under 35 U.S.C. § 371 of International Application No. PCT/EP2018/075318 filed 19 Sep. 2018, which claims priority to European Patent Application No. 17306218.3 filed 19 Sep. 2017. The entire contents of each of the above-referenced disclosures is specifically incorporated by reference herein without disclaimer.

TECHNICAL FIELD OF THE INVENTION

The invention relates to the optics field, more particularly to an optical article, preferably an ophthalmic lens, especially for correcting color vision for individuals with color visions deficiency, while being aesthetic.

BACKGROUND INFORMATION AND PRIOR ART

A large proportion of the population, in particular men, suffers from some form of color blindness or dyschromatopsia which reduces eye discrimination of different colored objects.

Especially, all over the world, with a higher prevalence in western word, 7-10% of males and 0.5 to 1% of females are colorblind from a congenital color deficiency. It means that one of the three color photoreceptors: Long wavelength "L", Medium wavelength "M" and short wavelength "S" cones, which are sensitive to the red, green and blue portions of the visible spectrum respectively, presents a shift (or lack) of spectral sensitivity. These people can discriminate less colors that people with normal color vision.

They are several types of dyschromatopsia: anomalous trichromacy (shift of spectral sensitivity of the opsin contained in the photoreceptor) or dichromacy (a photoreceptor does not transmit signal).

The most recurrent color deficiency is deuteranomaly which is a red-green confusion provoked by M cone deficit. Thus, if a red/green color blind viewer were to look at an apple tree, any red apples would not stand out from the otherwise green leaves of the tree and the primary way that the apples could be distinguished would be by viewer recognition of the apple outline. Obviously, this condition causes increased viewer problems in object discrimination and even more problems when it is necessary to distinguish between red and green under circumstances where other characteristics (e.g. shape, outline, etc.) are not distinguishable.

Generally, so as improve the ability of a color blind individual, the optical article such as spectacle lens, comprises a selective filter, like an absorptive magenta dye, which is able to cut in the green of the visible spectrum.

However, the resulting colored lens has a pinky unsightly aspect which is not easy to wear for men who are the most affected by color blindness.

In order to reduce these pink appearance, several solutions have been proposed in the prior art.

For instance, to render the appearance of lenses for color blindness more acceptable, U.S. Pat. No. 6,089,712 discloses a lens, where a central portion of the lens is tinted with the desired color correction for the individual eye and the outer surface of the lens is coated with a mirrored reflective material to make the color tinting invisible to an outside observer. The technique described in this document provides the desired color correction.

However, the presence of the mirror reflective surface on the lens has been found to be cosmetically unacceptable to some. Additionally, the mirrored surface may reflect such a high percentage of light that the spectacles may produce an image that is too dark for the wearer. Furthermore, the high reflectivity of the mirror often introduces unwanted backside reflection to the wearer's eye.

For masking the pinky color of tinted lens for correcting color blindness, document WO2009/001703 discloses a lens which is prepared by first tinting the lens to a desired corrective color with a light filtering material and then dyeing the lens with a masking material having a neutral appearing tint. Especially, the filtering material is a color tint dye, which modifies the transmission of light in at least a region of the spectrum between 400 nm and 700 nm, e.g., by selectively absorbing a portion of the light within a selected wavelength range of the visible spectrum, and the masking material may comprise a neutral tint dye, e.g., one with a slight blue, brown, or gray tint. The masking dye absorbs light generally evenly over the entire visible range. It may be dispersed in the lens substrate and may be concentrated more highly toward the surface of the lens. By concentrating the mask material near the outside of the lens, the neutral tint predominates and the tint effect of the filtering material would be masked to an outside observer.

It is mentioned that lenses of different color tints can be provided for each of the patient's eyes and in a manner that renders the color corrective lenses substantially indistinguishable to an outside observer.

However, the transparency level of those special filtering lenses is very difficult to be controlled by tinting with mixed dyes.

In view of the foregoing issues, there is a need for an optical lens for correcting color visions for individuals with color visions deficiency, while having at the same time aesthetic appearance and robustness.

Especially, there is a need to provide color corrective optical lens, for instance for patients with color blindness to treat the disability, but in which the color tints are not discernible to an outward observer and which are not prohibitively costly.

There is also a need to provide such an optical lens which enables in addition driving constraints.

It is also desirable that the process for manufacturing such optical article is simple, easy to implement and reproducible.

SUMMARY OF THE INVENTION

To address the needs of the present invention and to remedy at least to the above mentioned drawbacks of the prior art, the applicant provides an optical lens comprising a substrate and a filtering means (such as an absorbing dye) which has at least a minimum light transmission factor "Tmin (515-580)" in the visible spectrum at a wavelength ranging from 515 nm to 580 nm that is lower than or equal to 40%, said optical lens having the following transmission characteristics in the visible spectrum ranging from 380 to 700 nm:

the transmission curve has a negative relative slope on the wavelength ranging from 485 to 515 nm and absolute value of said relative slope is larger than $4 \cdot 10^{-3}$ nm$^{-1}$, preferably larger than $6.6 \cdot 10^{-3}$ nm$^{-1}$, even preferably larger than $8.2 \cdot 10^{-3}$ nm$^{-1}$ the transmission curve has a positive relative slope on the wavelength ranging from 580 to 610 nm and value of said relative slope is larger than $4\ 10^{-3}\ nm^{-1}$, preferably larger than $6\ 10^{-3}\ nm^{-1}$, an average transmission on the range from 435 to 485 nm which is larger than 5% and larger than the T515-580, T515-580 being the average transmission over the range from 515 nm to 580 nm, an average transmission on the range from 610 to 700 nm which is larger than T515-580, and an average transmission on the range from 515 to 580 nm which is lower than (T500+T595)/2, T500 being the transmission at 500 nm T595 being the transmission at 595 nm.

As used herein, the relative slope of the transmission curve over a range of wavelength from L1 to L2 is the slope of the straight line fitting the transmission curve over said wavelength range (by any fitting method, such as minimum mean square error), divided by the average transmission over said wavelength range.

For instance, if transmission curve is a straight line with transmittance T1 at wavelength L1 and transmittance T2 at wavelength L2, the relative slope is:

$$\frac{\frac{(T2-T1)}{(L2-L1)}}{\frac{1}{2}(T1+T2)}$$

A high relative slope in absolute value, typically larger than $2.\ 10^{-3}\ nm^{-1}$, corresponds to a quick change of transmission in the transmission spectrum.

Especially, "a relative slope larger than $4\ 10^{-3}\ nm^{-1}$, preferably larger than $6.6\ 10^{-3}\ nm^{-1}$, even preferably larger than $8.2\ 10^{-3}\ nm^{-1}$" means a variation of transmission of respectively −13%, −20% and −25% for the wavelengths ranging from 485 to 515 nm.

Also, as used herein, "a relative slope larger than $4\ 10^{-3}\ nm^{-1}$ and preferably larger than $6\ 10^{-3}\ nm^{-1}$" means a variation of transmission of respectively +12% and +18% for the wavelengths ranging from 580 to 610 nm.

Herein, "Tmin (515_580)" lower or equal to 40%" " comprises at least the followings values: 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, etc. or any interval situated between these values.

Due to its properties, the optical lens according to the invention enables to provide a better color vision to people with color deficiency and help them discriminating colors (red and green in particular), while being aesthetic and having a good robustness.

Indeed, the Applicant has surprisingly discovered that the transmission curve as described above notably resulting from the use of the filtering means according to the invention (having Tmin (515-580) lower or equal to 40%), helps to improve contrast between green and red colors for individuals having color vision deficiency. Actually, the transmission of the lens is separated in five domains:

A blue domain, from 435 nm to 485 nm, where transmission shall not be too small. For mean transmission lower than 5% in this area, people can't support lenses giving a uniform red color to the surrounding, A first transition domain, from 485 nm to 515 nm, where transmission decreases quickly, A green domain, from 515 nm to 580 nm, where transmission shall be optimized: low for colour disambiguation, but sufficient to allow usual activities such as driving, A second transition domain, from 580 nm to 610 nm, where transmission increases quickly, A red domain from 610 nm to 700 nm. The majority of light transmitted to the wearer is in this domain.

In addition, the quick variations of transmission curves around 500 nm (decreasing transmission) and around 595 nm (increasing transmission) bring interesting performances for colour disambiguation.

As previously mentioned, colorblind or dyschromatopsia results to a spectral sensitivity of the S, M or L photoreceptor cone of the colorblind individual. Hence, for two different wavelengths 1 (red) and 2 (green), the colorblind individual has the same spectral sensitivity, i.e. (S1, M1, L1)=(S2, M2, L2). Thus, he perceives red and green colors as similar. Therefore, the colorblind individual needs to receive different stimulations in red and green areas. In order to do that, the Applicant has discovered that filtering or cutting the area where the spectral sensitivity of M and L are overlapping, i.e. around 565 nm, and especially between 515 and 580 nm thanks to a filtering means, such as an absorbing dye, helps to improve contrast between green and red color. In particular, it is required that the filtering means has a Tmin (515-580) which is lower or equal to 40%.

In addition, the Applicant has found that the transmission curve should be specific in the visible region such as described above so as to limit the unsightly pinky aspect without changing the filtering function of the filtering means.

In some embodiments, the optical lens is further defined as having a $Q_{blue}/Q_{green}$ as described in the Q values according to the standard ISO 13666-2013 (page 43, § 15.5) which is higher than 1.1.

In some embodiments, the optical lens is further defined as having $Q_{red}/Q_{green}$ as described in the Q values according to the standard ISO 13666-2013 (page 43, § 15.5) which is higher than 1.4, preferably 1.5, more preferably 1.9 and even preferably higher than 2.5.

In some embodiments, the absorbing dye has a minimum light transmission factor in the visible spectrum at a wavelength ranging from 515 to 580 nm Tmin (515-580) which is lower or equal to 30%, preferably which is lower or equal to 20%, more preferably which is lower than or equal to 10%.

In some embodiments, the optical lens further comprises at least one color balancing component.

In some embodiments, the optical lens further comprises at least one mirror stack on the main front face of the substrate. Such a mirror stack improves aesthetic of lenses as seen by an observer.

In some embodiments, the optical lens further comprises at least one antireflective stack on the main rear face of the substrate. Such antireflective stack limits reflection of light coming from the side or back of the wearer. For coloured lenses, which transmit only a small part of light, limiting back side reflection is crucial to avoid glare and discomfort.

In some embodiments, the optical lens further comprises at least one broadband absorbing layer in the overall visible spectrum (i.e. asymmetric interferential filter, and/or polar film, etc.), so as to decrease transmission in the overall visible spectrum. Such a broadband absorbing layer lowers light transmission without changing colour balance of the lens.

In one embodiment, the optical lens comprises a relative light transmission factor in the visible spectrum Tv is ranging from 8% to 18%, preferably from 12% to 18%.

According to this embodiment, the optical lens is further defined as having a ratio $Q_{red}/Q_{green}$ which is ranging from 2.5 to 5.0 and the ratio $Q_{blue}/Q_{green}$ which is ranging from 1.1 to 2.5 and $Q_{green} \geq 0.6$.

According to this embodiment, the optical lens further comprises a polarizing film or an asymmetric interferential coating.

According to this embodiment, the optical lens is sunglasses.

In another embodiment, the optical lens comprises a relative light transmission factor in the visible spectrum Tv is ranging from 18 to 43%.

According to this embodiment, the optical lens further comprises a ratio $Q_{red}/Q_{green}$ which is ranging from 1.8 to 5.0, preferably from 1.9 to 4 and the ratio $Q_{blue}/Q_{green}$ which is ranging from 1.0 to 2.0, preferably from 1.1 to 1.8 and $Q_{green} \geq 0.7$.

In another embodiment, the optical lens comprises a relative light transmission factor in the visible spectrum Tv is ranging from 43 to 80%, preferably from 60 to 70%.

According to this embodiment, the optical lens further comprises a ratio $Q_{red}/Q_{green}$ which is ranging from 1.0 to 2.0, preferably from 1.4 to 1.6 and the ratio $Q_{blue}/Q_{green}$ is ranging from 1.1 to 2.05, preferably from 1.2 to 1.5 and $Q_{green} \geq 0.9$.

According to this embodiment, the optical lens is eyeglasses, especially eyeglasses with clear lenses.

A further object of the invention is the use of an optical lens such as defined above for correcting color vision for individuals with color vision deficiency, or for improving colour perception while driving.

The feature or features of one embodiment may be applied to other embodiments even though not described or illustrated, unless expressly prohibited by the disclosure or the nature of the embodiments.

Some details associated with the embodiments described above and others are described below.

BRIEF DESCRIPTION OF THE FIGURES

The present invention will be described in more detail by referring to the appended drawings, wherein.

DETAILED DESCRIPTION OF THE INVENTION

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values «from X to Y» or "between X to Y", according to the present invention, means as including the values of X and Y.

In addition, any layer having a thickness lower than 0.8 nm will not be considered when counting the number of layers in the antireflective coating.

Unless stated otherwise, all thicknesses disclosed in the present application relate to physical thicknesses.

In the present application, when an ophthalmic lens comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

As used herein, the rear (or inner or Concave or CC) face of the substrate is intended to mean the face which, when using the ophthalmic lens, is the nearest from the wearer's eye. It is generally a geometrically concave face. On the contrary, the front (or Convex or CX) face of the substrate, is the face which, when using the ophthalmic lens, is the most distant from the wearer's eye. It is generally a geometrically convex face.

As used herein, the "angle of incidence (symbol ⊾)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b* (1976). Generally the angle of incidence changes from 0° (normal incidence) to 90° (grazing incidence). The usual range for angle of incidence is from 0° to 75°.

The colorimetric coefficients of the optical article of the invention in the international colorimetric system CIE L*a*b* (1976) are calculated between 380 and 780 nm, taking the standard illuminant D 65 and the observer into account (angle of 2°). The observer is a "standard observer" as defined in the international colorimetric system CIE L*a*b*.

The Tv factor, also called "luminous transmission" of the system, is such as defined in the standard ISO 13666:1998 and relates to an average in the 380-780 nm wavelength range that is weighted according to the sensitivity of the eye at each wavelength of the range and measured under D65 illumination conditions (daylight).

In the present description, unless otherwise specified, transmittances/transmissions are measured at the center of the optical article for a thickness ranging from 0.7 to 2 mm, preferably from 0.8 to 1.5 mm, at an angle of incidence ranging from 0° to 15°, preferably 0°. As used herein, the light transmitted refers to light arriving on the front main face of the optical article and that went through the lens.

Herein, the "luminous reflectance" noted $R_v$, is such as defined in the ISO 13666:1998 Standard, and measured in accordance with the ISO 8980-4, i.e. this is the weighted spectral reflection average over the whole visible spectrum between 380 and 780 nm. $R_v$ is usually measured for an angle of incidence lower than 17°, typically of 15°, but can be evaluated for any angle of incidence.

In the present application, the "mean reflection factor," noted $R_m$, is such as defined in the ISO 13666:1998 Standard, and measured in accordance with the ISO 8980-4 standard (for an angle of incidence lower than 17°, typically of 15°), i.e., this is the (non-weighted) spectral reflection average over the whole visible spectrum between 400 and 700 nm.

In the present application, $R_v$ and $R_m$ factors have been measured at an angle of incidence of 15°.

According to the invention, the Q-value ratio of the luminous transmittance of a tinted lens for the spectral radiant power distribution of the light emitted by a traffic signal τSIGN to the luminous transmittance of the same lens for CIE illuminant D65 (τv)

$$Q = \frac{\tau_{SIGN}}{\tau_V}$$

where τSIGN is the luminous transmittance of the lens for the spectral radiant power distribution of the traffic signal light. Q-values may be determined for each of blue, green, amber (yellow) and red signal lights. τSIGN is given by the equation:

$$\tau_{SIGN} = 100 \times \frac{\int_{380\,nm}^{780\,nm} \tau(\lambda) \cdot \tau_S(\lambda) \cdot V(\lambda) \cdot S_{A\lambda}(\lambda) \cdot d\lambda}{\int_{380\,nm}^{780\,nm} \tau_S(\lambda) \cdot V(\lambda) \cdot S_{A\lambda}(\lambda) \cdot d\lambda} \%$$

where $\tau_s(\lambda)$ is the spectral transmittance of the traffic signal lens;
$S_{A\lambda}(\lambda)$ is the spectral distribution of radiation of CIE standard illuminant A (or 3 200 K light source for blue signal light) (see ISO/CIE 10526);
$V(\lambda)$ is the spectral luminous efficiency function for daylight (see ISO/CIE 10527) and
$\tau(\lambda)$ is the spectral transmittance of the tinted spectacle lens; The spectral values of the products of the spectral distributions $S_{A\lambda}(\lambda)$ of the illuminant A, the spectral luminous efficiency function $V(\lambda)$ of the eye and the spectral transmittance $\tau_S(\lambda)$ of the traffic signal lens are given in table A.2 of standard ISO1366:19989.

As mentioned above, the present invention relates to an optical lens comprising a substrate and a filtering means which has at least a minimum light transmission factor "Tmin (515-580)" in the visible spectrum at a wavelength ranging from 515 nm to 580 nm that is lower than or equal to 40%, said optical lens having the following transmission characteristics in the visible spectrum ranging from 380 to 700 nm:

the transmission curve has a negative relative slope on the wavelength ranging from 485 to 515 nm and absolute value of said relative slope is larger than $4 \cdot 10^{-3}$ nm$^{-1}$, preferably larger than $6.6 \cdot 10^{-3}$ nm$^{-1}$, even preferably larger than $8.2 \cdot 10^{-3}$ nm$^{-1}$ the transmission curve has a positive relative slope on the wavelength ranging from 580 to 610 nm and value of said relative slope is larger than $4 \cdot 10^{-3}$ nm$^{-1}$, preferably larger than $6 \cdot 10^{-3}$ nm$^{-1}$, an average transmission on the range from 435 to 485 nm which is larger than 5% and larger than the T515-580, T515-580 being the average transmission over the range from 515 nm to 580 nm, an average transmission on the range from 610 to 700 nm which is larger than T515-580, and an average transmission on the range from 515 to 580 nm which is lower than (T500+T595)/2, T500 being the transmission at 500 nm T595 being the transmission at 595 nm.

Generally, the optical lens according to the present invention is a transparent colored optical lens, preferably an ophthalmic lens or lens blank including spectacle lenses and sunglass lenses.

In the present description, unless otherwise specified, an optical article is understood to be transparent when the observation of an image through said optical article is perceived by a wearer and/or an observer without adversely affecting the quality of the image. This definition of the term "transparent" can be applied to all objects qualified as such in the description, unless otherwise specified.

The term "ophthalmic lens" is used to mean a lens adapted to a spectacle frame to protect the eye and/or correct the sight. Said lens can be chosen from a focal, unifocal, bifocal, trifocal and progressive lenses. Although ophthalmic optics is a preferred field of the invention, it will be understood that this invention can be applied to optical elements of other types where colored filter may be beneficial (for correcting color discrimination or filtering phototoxic blue wavelength), such as, for example, lenses for optical instruments, filters particularly for photography or astronomy, optical sighting lenses, ocular visors, optics of lighting systems, screens, glazings, etc.

In particular, the substrate, in the sense of the present invention, should be understood to mean an uncoated substrate, and generally has two main faces: a front main face and a rear main face. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material acts as support for the stack of one or more coatings or layers.

The substrate of the article of the invention may be a mineral or an organic substrate, for instance an organic substrate made from a thermoplastic or thermosetting plastic, generally chosen from transparent materials of ophthalmic grade used in the ophthalmic industry.

To be mentioned as especially preferred classes of substrate materials are polycarbonates, polyamides, polyimides, polysulfones, copolymers of polyethylene therephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company, the corresponding marketed lenses being referred to as ORMA® lenses from ESSILOR), polycarbonates such as those derived from bisphenol-A, (meth) acrylic or thio(meth)acrylic polymers and copolymers such as poly methyl methacrylate (PMMA), urethane and thiourethane polymers and copolymers (such as MR series from Mitsui Chemicals), epoxy polymers and copolymers, episulfide polymers and copolymers.

Prior to deposition of any functional coatings, such as an abrasion-resistant layer and/or a scratch-resistant coating or with a sub-layer, the surface of said optionally coated substrate is usually submitted to a physical or chemical surface activating treatment, so as to reinforce the adhesion of the asymmetric interferential multilayer stack. Such pretreatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

In order to improve the contrast between green and red colors for colorblind people, while having a cosmetically acceptable appearance when viewed by an external observer, in particular perceived as mostly color neutral, the optical article comprises a filtering means to provide with specific transmission curve characteristics.

Various filtering means, also named "selective/functional filters", may be used. In particular, absorbing dye or mixtures of absorbing dyes may be used. Interferential filters such as Multilayer Optical Filter (MOF) or Photonic Crystal or Holographic filter may also be used. Interferential filters can provide very selective filters. As used herein, a filtering means corresponds to a coloring component which is able to cut at least one band of the visible spectrum through absorption or reflection. Indeed, absorbing dyes are used to color lens substrate therewith, by which a given color vision rectifying spectral characteristic curve is obtained by a filtering effect wherein light with a specific wavelength, here between 515 to 580 nm, is absorbed. Besides, interferential filters are used to color lens substrate therewith, by which a given color vision rectifying spectral characteristic curve is obtained by a filtering effect wherein light with a specific wavelength, here between 515 to 580 nm, is reflected.

As previously mentioned, the optical lens according to the invention has the following transmission characteristics in the visible spectrum ranging from 380 to 700 nm:
the transmission curve has a negative relative slope on the wavelength ranging from 485 to 515 nm and absolute value of said relative slope is larger than $4\ 10^{-3}\ nm^{-1}$, preferably larger than $6.6\ 10^{-3}\ nm^{-1}$, even preferably larger than $8.2\ 10^{-3}\ nm^{-1}$ the transmission curve has a positive relative slope on the wavelength ranging from 580 to 610 nm and value of said relative slope is larger than $4\ 10^{-3}\ nm^{-1}$, preferably larger than $6\ 10^{-3}\ nm^{-1}$, an average transmission on the range from 435 to 485 nm which is larger than 5% and larger than the T515-580, T515-580 being the average transmission over the range from 515 nm to 580 nm, an average transmission on the range from 610 to 700 nm which is larger than T515-580, and an average transmission on the range from 515 to 580 nm which is lower than (T500+T595)/2, T500 being the transmission at 500 nm T595 being the transmission at 595 nm.

According to the invention, the average transmission on the range from 435 to 485 nm is larger than 5%, preferably 7%, more preferably 10%. Increasing the average transmission in the blue domain limits the perception of the surrounding in a reddish uniform tint.

According to the invention, an average transmission T1 is "larger" than an average transmission T2 when the ratio T1/T2 is larger than 1.01, preferably larger than 1.1, more preferably larger than 1.2. A larger difference is preferable as colour disambiguation is associated to a clear reduction of transmission in the green domain as compared to the blue and red domains.

In particular, the optical lens is further defined as having a $Q_{blue}/Q_{green}$ which is higher than 1.1, preferably higher than 1.2 and ideally higher than 1.4.

As used herein, a value higher than 1.1 comprises at least the followings values: 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1; 3.2; 3.4; 3.5; 3.6; 3.7; 3.8; 3.9; 4; 4.1; 4.2; 4.3; 4.4; 4.5; 4.6; 4.7; 4.8; 4.9; 5.0; etc. or any interval situated between these values.

Also, the optical lens is advantageously defined as having $Q_{red}/Q_{green}$ which is higher than 1.4, preferably higher than 1.5, more preferably higher than 1.9 and even preferably higher than 2.5.

As used herein, a value higher than 1.4 comprises at least the followings values: 1.4, 1.5, 1.6, 1.7, 1.8, 1.9, 2.0, 2.1, 2.2, 2.3, 2.4, 2.5, 2.6, 2.7, 2.8, 2.9, 3.0, 3.1; 3.2; 3.4; 3.5; 3.6; 3.7; 3.8; 3.9; 4; 4.1; 4.2; 4.3; 4.4; 4.5; 4.6; 4.7; 4.8; 4.9; 5.0; etc, or any interval situated between these values.

Therefore, the optical lens according to the invention responds to driving constraints.

The transmission curve characteristics notably derive from the use of a specific filtering means, in particular a specific filtering means.

According to the invention, the transmission factor Tmin (515-580) of the filtering means (such as the absorbing dye) is lower or equal to 40%, preferably lower or equal to 35% and typically lower or equal to 20%.

As used herein, "a transmission factor Tmin (515-580) lower or equal to 40%" comprises at least the following values or any interval situated between these values: 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 9, 8, 7, 6, 5, 4, 3, 2, 1, etc. and is typically ranging from 1 to 40%.

In a preferred embodiment, the filtering means (such as the absorbing dye) has a minimum light transmission factor in the visible spectrum at a wavelength ranging from 515 nm to 580 nm Tmin (515-580) which is lower or equal to 30%, preferably which is lower or equal to 20%, more preferably which is lower than or equal to 10%.

According to the invention, "a colored substrate" means that the light transmitted through the substrate is not white, but colored, that is to say, the light from a white fluorescent source is reflected from the surface of the substrate to an observer such that the reflected light is colored.

As used herein, an absorbing dye may refer to both a pigment and a colorant, i.e., can be respectively insoluble or soluble in its vehicle.

Generally, the absorbing dye is incorporated directly into the substrate, and/or is incorporated in one coating deposited directly or indirectly at the surface of the substrate and this at a suitable concentration.

For instance, several methods of adding an absorbing dye is usable including a method wherein prior to the polymerization of a plastic lens substrate, a pigment is formulated into a monomer material, a method of dyeing a plastic lens substrate. The dyeing method of a plastic lens substrate includes a method of directly dyeing a lens substrate, and a method wherein a dyeable hard coat film (varnish) is first formed on a surface of a lens substrate and then the hard coat film is dyed.

The absorbing dyes usable in the present invention includes, solvent dyes, disperse dyes, and the like. For coloration of plastic lens substrates with solvent dyes, mention is made of methods including an internal coloring method wherein dye, is incorporated in a raw material, followed by polymerization. In another method a dye is capable of forming hydroxyl interactions with the lens substrate via immersion (also called imbibition, also called dip tinting). For complete dyeing, it is preferred to treat the lens with alkaline solution prior to immersion, or other surface preparation (corana, plasma, UV). Examples of the solvent dye include Orasol363 (BASF), Orasol190 (BASF), S0360 (FEW), Solvent Red 160, Solvent Red 175, Solvent Red 180, Solvent Red 216, Yellow HLR (Sumika). Examples of the disperse dye include NFR (Huntsman), NFB (Huntsman), NFY (Huntsman), Rouge E127 (Colorey), Iragon Orange AOR7HSC, Disperse Red 146, Disperse Red 199, Disperse Red 202, Disperse Red 204, Disperse Red 291 . . . .

For the immersion method (also called dip tinting) it is usual to use a disperse dye dispersed in hot water, or an oil-soluble dye is dissolved in an organic solvent, into which the lens substrate is immersed.

In this case, in order to obtain an intended spectral characteristic curve, the absorbing dyes mentioned above may be used singly or in combination of two or more, for instance to obtain color balancing.

According to an embodiment of the invention, this absorbing dye has a narrow absorption band in the green light: i.e., 500-580 nm range of the visible spectrum. Ideally, said absorption band is centered on around 560 nm. It is preferable that the dye does not have other absorbing bands, unless they are smaller than the one at 560 nm.

According to this embodiment, the chemical nature of the absorbing dye that may act as a means for at least partially inhibiting light having a wavelength ranging from 515 nm to 580 nm is not particularly limited, provided that it has an absorption peak, ideally a maximum absorption peak, within the 515 nm to 580 nm range. The FWHM (Full Width at Half Maximum) of the absorption spectrum of such dye in solution is preferably lower than 60 nm, preferably lower than 40 nm. When such dye is included in the substrate and/or coating, its absorption properties are modified and the FWHM (Full Width at Half Maximum) of the transmission spectrum of the optical lens comprising such dye is preferably lower than 100 nm, preferably lower than 60 nm. As used herein, FWHM corresponds to the width of a filter band, according to the configuration of use.

In one aspect of this embodiment, the coloring component has a narrow absorption band in the green light ranging from 500 to 560 nm of the electromagnetic spectrum.

In another aspect of this embodiment, the coloring component has a narrow absorption band in the green light ranging from 560 to 595 nm of the electromagnetic spectrum.

Preferably, the filtering means (absorbing dye) blocks at least 60%, preferably from 60 to 99% and typically from 80 to 99% of the light having a wavelength ranging from 515 to 580 nm arriving on said front main face of the substrate (a).

As used herein, "blocking at least 60%" comprises at least the followings values or any interval situated between these values: 60, 61, 62, 63, 64, 65, 66, 67, 68, 69, 770, 71, 72, 73, 74, 75. 80, 81, 82, 83, 84, 85, 86, 87, 88, 89, 90, 91, 92, 93, 94, 95, 96, 97, 98, 99, 100.

In the present application, "blocking X %" of incident light in a specified wavelength range does not necessarily mean that some wavelengths within the range are totally blocked, although this is possible. Rather, "blocking X %" of incident light in a specified wavelength range means that an average of X % of said light within the range is not transmitted. As used herein, the light blocked in this way is light arriving on the front main face of the optical article.

The absorbing dyes typically may include one or more dyes commercialize under the tradename: Orasol 363 from BASF, Heliotrop Lumacel R (M. Dohmen), Sulforhodamine B (CAS number: 2609-88-3), NFR (teratop red dye from Huntsman), NK1 (Nidek technology) or a combination thereof.

In order to compensate for the colored effect of the absorbing dye, at least one masking means may be used. Advantageously, this masking means may be applied on the front main face and/or on the rear main face of the substrate, and enable to limit the pinky unpleasant appearance due to the use of the absorbing dye.

$1^{st}$: Color-Balancing Component

According to a first embodiment of the invention, the masking means may be one color-balancing component.

In particular, the color-balancing component employed to at least partially offset the pinky effect is a dye, such as a yellow tinting dye, or a mixture of dyes used in suitable proportions, such as a combination of yellow and blue tinting dyes.

Hence, these dyes enable for instance to mask the pink appearance of the optical lens to reddish appearance or violet-bluish appearance, which are more pleasant colors.

Color balancing dyes are typically incorporated in a color-balancing coating or film applied on the surface of the optical article, such as a primer coating, hard coat or antireflection coating. They can also be incorporated in the same coating or immersion bath as the main absorbing dye.

Examples of suitable fixed-tint colorants can include, any of the art recognized inorganic and organic pigments and/or dyes, especially yellow, for instance, Orasol 190, DT10-18B, S0232 (supplier: FEW), Yellow HLR (supplier: Sumika) As for the absorbing dye, the color-balancing component is preferably contained in the substrate and/or in the coating of the optical lens.

Methods for incorporating an absorbing dye or a color-balancing means in the mass of the substrate of the optical article include, for example:
    I.—impregnation or imbibition methods consisting in dipping the substrate in an organic solvent and/or water based hot coloration bath, preferably a water based solution, for several minutes. Substrates made from organic materials such as organic lens substrates are most often colored in the bulk of the material by dipping in aqueous coloration baths, heated to temperatures of the order of 90° C., and in which the optical filtering means or color-balancing means has been dispersed. This compound thus diffuses under the surface of the substrate and the color density is obtained by adjusting the quantity of compound diffusing in the body of the substrate, II.—the diffusion methods described in JP 2000-314088 and JP 2000-241601, involving an impregnable temporary coating, III.—contactless coloration using a sublimable material, such as described in U.S. Pat. Nos. 6,534,443 and 6,554,873, or IV.—incorporation of the compound during the manufacture of the substrate itself, for example by casting or injection molding, if it is sufficiently resistant to high temperatures present during casting or injection molding. This is preferably carried out by mixing the compound in the substrate composition (an optical material resin or a polymerizable composition) and then forming the substrate by curing the composition in an appropriate mold.

In another embodiment, the optical lens comprises a substrate and at least one layer coated on the substrate, wherein the absorbing dye and/or the color-balancing means is incorporated into said at least one layer coated on the substrate. These compounds may be incorporated, for example, into a specific coating for dyes or a hard coating and/or a primer coating, which generally promotes adhesion of the hard coating to the substrate. They can also be incorporated into a film that will be subsequently transferred, laminated, fused or glued to the substrate.

Several methods may be used for incorporating the optical filtering means (and/or the color-balancing means) in a layer. These compounds may be deposited at the same time as the layer, i.e., when the layer is prepared from a liquid coating composition, they can be incorporated (directly or for example as particles impregnated by the compound) or dissolved in said coating composition before it is applied (in situ mixing) and hardened at the surface of the substrate.

The absorbing dye and/or the color-balancing component may also be included in a coating in a separate process or sub-process. For example, the compound may be included in the coating after its deposition at the surface of the substrate, using a dipping coloration method similar to that referred to for coloring the substrate, i.e., by means of tinting bath at elevated temperatures, through the diffusion method disclosed in US 2003/0020869, in the name of the applicant, through the method disclosed in US 2008/127432, in the name of the applicant, which uses a printing primer that undergoes printing using an inkjet printer, through the method disclosed in US 2013/244045, in the name of the applicant, which involves printing with a sublimation dye by means of a thermal transfer printer, or though the method disclosed in US 2009/047424, in the name of the applicant, which uses a porous layer to transfer a coloring agent in the substrate. The compound may also be sprayed onto a surface before the coating is cured (e.g., thermally or UV cured), dried or applied.

Obviously, combinations of several of the above described methods can be used to obtain an optical article having at least one optical filtering means and/or color-balancing means incorporated therein.

The amount of absorbing dye used in the present invention is an amount sufficient to provide a color correction for blindness people, while the amount of color-balancing means used in the present invention is an amount sufficient to offset the pinkish effect caused by the absorbing dye.

$2^{nd}$: Broadband Absorbing Layer

In a second embodiment on the invention, the masking means may be one broadband absorbing layer, such as an asymmetric interferential coating or a polar film. This broadband absorbing layer is especially able to absorb in the visible region (wavelength ranging from 380 to 780 nm).

Asymmetric Interferential Coating

According to one aspect of this embodiment, the broadband absorbing layer may be an asymmetric interferential coating comprising at least an absorbing layer which absorbs in the visible region at a wavelength ranging from 380 to 780 nm.

Without being bound by any theories, it seems an asymmetric interferential multilayer stack enables to adjust/tune the transparency level of the optical article by providing a flat transmission curve. Especially, this flat transmission curve of the interferential absorbing stack added to the filtering means reduces transmissions baseline which decreases the saturation of the coloring agent (less Chroma C*, less vivid color) and the luminous transmittance in the visible range, Tv. In addition, the neutral effect of the interferential multilayer stack on the selectivity of the absorbing dyes (functional filter), maintains the global filtering function and thus the wearer benefit.

As used herein, an "asymmetric interferential multilayer stack" refers to a stack for which reflection properties are different when viewing from its both sides.

Especially, the interferential multilayer stack has a luminous transmittance in the entire visible spectrum (380 to 780 nm) "Tv" lower than or equal to 75%, preferably ranging from 25 to 75% and more preferably from 40 to 55%.

Generally, the asymmetric interferential multilayer stack comprises an alternating stack of one layer having a low refractive index (LI) and one layer having a high refractive index (HI).

In the present application, a layer of the asymmetric interferential multilayer stack is said to be a layer with a high refractive index (HI) when its refractive index is higher than or equal to 1.55, preferably higher than or equal to 1.6, even more preferably higher than or equal to 1.7, even more preferably higher than or equal to 1.8 and most preferably higher than or equal to 1.9. Said HI layer preferably has a refractive index lower than 3.

A layer of asymmetric interferential multilayer stack is said to be a low refractive index layer (LI) when its refractive index is lower than 1.55, preferably lower than or equal to 1.50, more preferably lower than or equal to 1.48. Said LI layer preferably has a refractive index higher than 1.1.

Unless otherwise specified, the refractive indexes referred to in the present application are expressed at 25° C. at a wavelength of 550 nm.

In one aspect of this embodiment, the absorbing layer of the asymmetric interferential multilayer stack is a high refractive index (HI).

In one aspect of this embodiment, the absorbing layer of the asymmetric interferential multilayer stack comprises at least: one metallic material selected from the metals, or metal nitrides of one or more of Silver (Ag), Aluminium (Al), Gold (Au), Barium (Ba), Boron (B), Cadmium (Cd), Cerium (Ce), Cobalt (Co), Chromium (Cr), Copper (Cu), Iron (Fe), Germanium (Ge), Hafnium (Hf), Indium (In), Iridium (Ir), Potassium (K), Lanthanum (La), Magnesium (Mg), Manganese (Mn), Molybdenum (Mo), Nickel (Ni), Neodymium (Nd), Niobium (Nb), Lead (Pb), Palladium (Pd), Platinum (Pt), Rhenium (Re), Antimony (Sb), Selenium (Se), Silicon (Si), Tin (Sn), Strontium (Sr), Tantalum (Ta), Titanium (Ti), Tellurium (Te), Thallium (Tl), Vanadium (V), Tungsten (N), Zinc (Zn) or Zirconium (Zr); or combination thereof;
one absorptive oxide selected from SiO, FeO, Fe2O3, Fe3O4, TiOx, ZnO, MgO, CrOx, graphite oxide, or combination thereof; and
optionally, one additional dielectric material (such as defined below), having preferably a high refractive index, so as to form a mixture with the metallic material and/or the absorptive oxide.

In another aspect of this embodiment, the absorbing layer of the asymmetric interferential multilayer stack comprises at least:
one organic molecule selected from complex of metallic compounds or carbon compounds, and
optionally, one additional dielectric material such as defined below, having a high refractive index so as to form a mixture with the organic molecule.

Alternatively of this embodiment, the organic molecule selected from complex of metallic compounds or carbon compounds may comprise one additional dielectric material having a low refractive index so as to form a mixture with the metallic material and/or with the organic molecule.

Generally, organic molecule selected from complex of metallic compounds and/or carbon compounds are deposited simultaneously with at least one dielectric material, such as described below so as to form the asymmetric interferential multilayer stack according to the invention.

Especially, complex of metallic compounds may be selected from CuPc: copper (II) phthalocyanine, Alq3: tris (8-hydroxyquinolinato)aluminium, etc., and carbon compounds may be selected from Fullerenes (C60, C70), Single Walled Carbon Nanotubes (SWNT), etc. or combination thereof.

In a specific embodiment, the absorbing layer has a relatively flat extinction coefficient over the whole visible wavelength, meaning that the extinction coefficient of the absorbing material is almost constant, with standard deviation is equal to or lower than 20%, preferably is equal to or lower the 15%, and typically is ranging from 5 to 20% of the average value.

As used herein, "lower than 20%" comprises at least the followings values or any interval situated between these values: 20, 19, 18, 17, 16, 15, 14, 13, 12, 11, 10, 9, 8, 17, 6, 5, 4, etc.

Preferably, the asymmetric interferential multilayer stack comprises an alternated stack of at least:
one first layer comprising and preferably corresponding to the absorbing layer made for instance from the components described above (i.e. one metallic material, one absorptive oxide, one organic molecule, a combination of these materials with one dialectic material or combination thereof), and
one second layer composed of at least one dielectric material, and which is different from the absorbing layer.

In general, the second layer defined above is made of at least one dielectric material selected from: $MgF_2$, $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, MgO, $Nd_2O_3$, $Nb_2O_5$, $Pr_2O_3$, $Sb_2O_3$, $Sc_2O_3$, SiO, $SiO_2$, $SnO_2$, $Ta_2O_5$, TiO, $TiO_2$, $Ti_2O_3$, $Ti_3O_5$, $WO_3$, $Y_2O_3$, $Yb_2O_3$, ZnO, $ZrO_2$; $AlF_3$, $BaF_2$, $CaF_2$, $CdF_2$, $CeF_3$, $HfF_4$, $LaF_3$, LiF, $MgF_2$, NaF, $Na_3AlF_6$, $Na_5Al_3Fl_{14}$, $NdF_3$, $PbF_2$, $PrF_3$, $SrF_2$, $ThF_4$, $ZrF_4$; $Si_3N_4$, AlN, or diamond-like carbon, or one mixture thereof, and is preferably $SiO_2$.

In one aspect of this embodiment, the asymmetric interferential multilayer stack may comprise an alternated stack of at least:
one HI layer corresponding to the absorbing layer made for instance from the components described above (one metallic material, one absorptive oxide, one organic molecule, a combination of these materials with one dialectic material or combination thereof), and
one LI layer.

Preferably, The LI layer is also well known and may comprise, without limitation, $SiO_2$, or a mixture of silica and alumina, especially silica doped with alumina, the latter contributing to increase the antireflective coating thermal resistance. The LI layer is preferably a layer comprising at least 80% by weight of silica, more preferably at least 90% by weight of silica, relative to the layer total weight, and even more preferably consists in a silica layer According to this embodiment, the asymmetric interferential multilayer stack may also comprise a layer having a high refractive index which is different from the absorbing layer described above; this second HI layer may be composed of at least one dielectric material, which is different from the absorbing layer.

This HI layer may be a traditional high refractive index layer that is well known in the art. It generally comprises one or more metal oxides such as, without limitation, zirconia ($ZrO_2$), titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium oxide ($Nb_2O_5$), yttrium oxide ($Y_2O_3$). Optionally, the HI layers may further contain silica or other materials with a low refractive index, provided they have a refractive index higher than or equal to 1.5 as indicated hereabove and may be SiO. The preferred materials include SiO, $TiO_2$, $PrTiO_3$, $ZrO_2$, $Al_2O_3$, $Y_2O_3$ and mixtures thereof.

Generally, the asymmetric interferential multilayer stack has a number of layers higher than or equal to 2, preferably equal or higher than 3 and typically higher than or equal to 4. The asymmetric interferential multilayer stack has a number of layers lower than or equal to 10, preferably lower than or equal to 8, more preferably lower than or equal to 6 and ideally lower than or equal to 5.

Preferably, the outer layer of said asymmetric interferential multilayer stack which is the furthest layer from the substrate is a low refractive index layer.

In particular, the asymmetric interferential multilayer stack comprises at least two layers with a low refractive index (LI) and at least two layers with a high refractive index (HI).

According to a particularly preferred embodiment, the asymmetric interferential multilayer stack is deposited on the concave side and comprises, in the direction moving away from the substrate,
a layer having a refractive index higher than or equal to 1.55 with a thickness of from 0.8 to 25 nm, preferably from 1 to 15 nm;
a layer having a refractive index lower than 1.55 with a thickness of from 90 to 130 nm, preferably from 100 to 120 nm;
a layer having a refractive index higher than 1.55 with a thickness of from 1 to 50 nm, preferably from 3 to 35 nm and a layer having a refractive index lower than 1.55, with a thickness of from 80 to 100 nm, preferably from 85 to 95 nm.

According to a particularly preferred embodiment, the asymmetric interferential multilayer stack is deposited on the convex side and comprises, in the direction moving away from the substrate, a layer having a refractive index higher than or equal to 1.55 with a thickness of from 0.8 to 25 nm, preferably from 1 to 20 nm;

a layer having a refractive index lower than 1.55 with a thickness of from 10 to 40 nm, preferably from 15 to 30 nm;

a layer having a refractive index higher than 1.55 with a thickness of from 1 to 50 nm, preferably from 3 to 35 nm and a layer having a refractive index lower than 1.55, with a thickness of from 10 to 40 nm, preferably from 15 to 30 nm.

In a preferred embodiment, the layer having a refractive index higher than or equal to 1.55 is made of at least Cr, a mixture of Ti/TiOx (such as Grey A supplied by Umicore) as absorbing layer or SiO and the layer having a refractive index lower than 1.5 is made of at least silica.

As used herein, a layer of the asymmetric interferential multilayer stack is defined as having a thickness higher than or equal to 0.8 nm. Thus, any layer having a thickness lower than 0.8 nm will not be considered when counting the number of layers in the asymmetric interferential multilayer stack.

According to one aspect of the invention, the absorbing layer total thickness is lower than 100 nm, preferably lower than or equal to 80 nm, more preferably lower than or equal to 50 nm and even more preferably lower than or equal to 40 nm. The absorbing layer total thickness is generally higher than 0.8 nm, preferably higher than 1 nm, and typically higher than 1.2 nm.

For instance, the absorbing layer may have a total thickness ranging from 0.8 to 10 nm, preferably ranging from 1 to 5 nm, as it is the case for instance when the absorbing layer is Cr.

Alternatively, the absorbing layer may have a total thickness ranging from 10 to 50 nm, preferably ranging from 20 to 40 nm, as it is the case for instance when the absorbing layer is a mixture of Ti/TiOx.

Generally, the asymmetric interferential multilayer stack total thickness is lower than 1 micrometer, preferably lower than or equal to 800 nm, more preferably lower than or equal to 500 nm and even more preferably lower than or equal to 250 nm. The antireflective coating total thickness is generally higher than 100 nm, preferably higher than 150 nm, and typically higher than 180 nm.

Preferably, the rear main face and/or the front main face of the optical article is/are coated with the asymmetric interferential multilayer coating.

Indeed, asymmetric interferential multilayer coating enables to decreases light intensity homogeneously over the whole visible spectrum to reach desired lens category (spectacle lenses, sunglasses) and decrease color saturation.

With the asymmetric property, it is possible to play with the stack design to obtain mirror reflection when observed from the convex side and antireflective behavior when observed from the concave side and this, by mastering absorption in transmission while keeping the selective properties of the filtering means.

Indeed, tests on people using tinted lenses (dye alone or with color balancing) with the flat absorbing interferential stack on the back of the lens showed that the addition of the interferential stack does not affect the filter efficiency (people improvement color discrimination between green and red). Besides thanks to that the transmission of the lens can be tuned and the final esthetic aspect is improved.

Thus, in some embodiments of the present optical article, asymmetric interferential multilayer coating is only coated on the rear main face of the substrate which is concave and the luminous reflectance on the concave face of the asymmetric interferential multilayer stack, which is the furthest from the substrate, is lower than or equal to 2.5%, preferably 2.0% and ideally lower than or equal 1.5%.

In some embodiments of the present optical article, asymmetric interferential multilayer coating is only coated on the front main face of the substrate which is convex and the luminous reflectance on the concave face of the asymmetric interferential multilayer stack, which is the nearest from the substrate, is lower than or equal to 2.5%, preferably 2.0% and ideally lower than or equal 1.5%.

In some embodiments of the present optical article, an identical asymmetric interferential multilayer coating is coated on the front main face and on the rear main face of the substrate (a), the rear main face being concave and the front main face being convex, the luminous reflectance on the concave faces of these asymmetric interferential multilayer stacks is lower than or equal to 2.5%, preferably 2.0% and ideally lower than or equal 1.5%.

In some embodiments of the present optical article, two different asymmetric interferential multilayer coating are coated on the front main face and on the rear main face of the substrate (a), the rear main face being concave and the front main face being convex, the luminous reflectance on the concave faces of these asymmetric interferential multilayer stacks is lower than or equal to 2.5%, preferably 2.0% and ideally lower than or equal 1.5%.

The various layers of the asymmetric interferential multilayer stack are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the asymmetric interferential multilayer stack is conducted by evaporation under vacuum.

Polar film According to another aspect of this embodiment, the broadband absorbing layer may be a polarizing film (hereinafter "polar") which absorbs in the visible region at a wavelength ranging from 380 to 780 nm.

For instance, the polar may be selected from a grey polar or a brown polar, such as a grey polar of category 2 having a Tv around 35% (Xperio from Essilor) or a brown polar of category 2 having a Tv around 27% (Xperio from Essilor).

$3^{rd}$: Mirror Stack on the Convex Face of the Substrate

The optical lens according to the invention may also comprise a mirror coating, preferably on its convex side.

The mirror coating is generally an interferential stack comprising alternated layer of HI and LI layers such as described above for the AR coatings, but which enables to increase the luminous reflection factor Rv on the side where it is place, preferably the convex face (front main face). For instance, the mirror coating may be a bilayer of $ZrO_2$ (50 nm)/$SiO_2$ (21 nm).

In particular, the optical article has a luminous reflectance $R_v$ higher than or equal to 2.5%, preferably higher than 4% and typically higher than 8% on said front main face.

Asymmetric interferential coatings, as described above, may be also suitable mirror stacks for the convex face of the substrate.

Other Functional Coatings

In some applications, it is preferred that the substrate's main surface be coated with one or more functional coating(s) to improve the optical and/or mechanical properties. The term "coating" is understood to mean any layer, layer stack or film which may be in contact with the substrate and/or with another coating, for example the other coatings of the optical lens.

A coating may be deposited or formed through various methods, including wet processing, gaseous processing, and film transfer. These functional coatings classically used in optics may be, without limitation, an impact-resistant and/or adhesion primer, an abrasion-resistant and/or scratch-resistant coating, an anti-reflection coating, a polarized coating, a photochromic coating, or an antistatic coating, or a stack made of two or more such coatings, especially an impact-resistant primer coating coated with an abrasion and/or scratch-resistant coating.

Abrasion- and/or scratch-resistant coatings (hard coatings) are preferably hard coatings based on poly(meth) acrylates or silanes. Recommended hard abrasion- and/or scratch-resistant coatings in the present invention include coatings obtained from silane hydrolyzate-based compositions (sol-gel process), in particular epoxysilane hydrolyzate-based compositions such as those described in the US patent application US 2003/0165698 and in U.S. Pat. No. 4,211,823 and EP614957.

The primer coatings improving the impact resistance and/or the adhesion of the further layers in the end product are preferably polyurethane latexes or acrylic latexes. Primer coatings and abrasion-resistant and/or scratch-resistant coatings may be selected from those described in the application WO 2007/088312.

The optical lens according to the invention may also comprise an antireflective coating, in particular on its concave side.

The antireflection coating may be any antireflection coating traditionally used in the optics field, particularly ophthalmic optics. An antireflective coating is defined as a coating, deposited onto the surface of an optical article, which improves the antireflective properties of the final optical article. It makes it possible to reduce the light reflection at the article-air interface over a relatively large portion of the visible spectrum.

Asymmetric interferential coatings, as described above, may be also suitable antireflective stacks for the concave side of the substrate.

As is also well known, antireflection coatings traditionally comprise a monolayered or a multilayered stack composed of dielectric and/or sol-gel materials and/or organic/inorganic layers such as disclosed in WO2013098351. These are preferably multilayered coatings, comprising layers with a high refractive index (HI) and layers with a low refractive index (LI).

Hi and LI layers of the antireflective coating are such as defined above.

Especially, the HI and LI layers are traditional layers well known in the art, generally comprising one or more metal oxides, which may be chosen, without limitation, from the materials disclosed in WO 2011/080472.

Preferred HI layers comprise at least one material selected from the group consisting of zirconia ($ZrO_2$), titanium dioxide ($TiO_2$), tantalum pentoxide ($Ta_2O_5$), niobium oxide ($Nb_2O_5$), alumina ($Al_2O_3$), praseodymium oxide ($Pr_2O_3$), praseodymium titanate ($PrTiO_3$), silicon nitride and silicon oxynitride.

Preferred LI layers comprise at least one oxide chosen from silicon oxide, silica, mixtures of silicon oxide and alumina. When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to $SiO_2+Al_2O_3$ total weight in this layer. The antireflective coating outer layer is preferably a LI layer, more preferably a silica-based layer.

Typically, HI layers have a thickness ranging from 10 nm to 120 nm, and LI layers have a thickness ranging from 10 nm to 100 nm.

Preferably, the antireflection coating total thickness is lower than 1 micron, more preferably lower than or equal to 800 nm and even more preferably lower than or equal to 500 nm. The antireflective total thickness is generally higher than 100 nm, preferably higher than 150 nm.

Still more preferably, the antireflective coating comprises at least two layers with a low refractive index (LI) and at least two layers with a high refractive index (HI). Preferably, the total number of layers in the antireflective coating is lower than or equal to 8, more preferably lower than or equal to 6, and preferably higher than or equal to 4.

HI and LI layers do not need to alternate with each other in the antireflective coating, although they also may, according to one embodiment of the invention. Two HI layers (or more) may be deposited onto each other, as well as two LI layers (or more) may be deposited onto each other.

The antireflection coating according to the invention may be deposited using methods known in the art, including spin-coating, dip-coating, spray-coating, evaporation, sputtering, chemical vapor deposition and lamination.

The various layers of the antireflective coating are preferably deposited according to any one of the methods disclosed in WO 2011/080472, which is hereby incorporated by reference. A particularly recommended method is evaporation under vacuum.

The structure and preparation of antireflection coatings are also described in more details in patent application WO 2010/109154 and WO 2012/153072.

In one embodiment of the invention, the rear main face of the optical article, the front main face of the optical article, or both, but preferably only the rear main face, are coated with an antireflective coating, preferably a multilayer one, such that the luminous reflectance on said rear main face and/or on said front main face in the visible region $R_v$ is lower than or equal to 2.5%.

In another embodiment of the invention, the rear main face of the optical article, the front main face of the optical article, or both, but preferably only the rear main face, are coated with an antireflective coating, preferably a multilayer one, such that the mean reflection factor on said rear main face and/or on said front main face in the visible region $R_m$ is lower than or equal to 2.5%.

In some aspects of the invention, the optical article has a luminous reflectance $R_v$ and/or an $R_m$ factor lower than or equal to 2%, 1.5%, 1%, 0.8% or 0.6% on at least one main face, preferably both on said rear main face and on said front main face.

In some aspects, the present invention provides an optical article further comprising a sub-layer, deposited before the antireflective coating, said sub-layer having preferable a refractive index lower than or equal to 1.55. The sub-layer is generally less than 0.5 micrometer thick and more than 100 nm thick, preferably more than 150 nm thick, more preferably the thickness of the sub-layer ranges from 150 nm to 450 nm. In another embodiment, the sub-layer comprises, more preferably consists in, silicon oxide, even better silica. Examples of usable sub-layers (mono or multilayered) are described in WO 2012/076174.

In some embodiments, the antireflective coating of the invention includes at least one electrically conductive layer. In a particular embodiment, the at least one electrically conductive layer has a refractive index greater than 1.55. The at least one electrically conductive layer serves as an antistatic agent. Without being bound by theory, the at least one electrically conductive layer prevents the multilayer antireflective coating stack from developing and retaining a static electric charge.

The ability for a glass to evacuate a static charge obtained after rubbing with a piece of cloth or using any other procedure to generate a static charge (charge applied by corona) may be quantified by measuring the time it takes for said charge to dissipate. Thus, antistatic glasses have a discharge time of about a few hundred milliseconds (ms), preferably 500 ms or less, whereas it is of about several tens of seconds for a static glass. In the present application, discharge times are measured according to the method disclosed in FR 2943798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided the anti-reflective properties thereof are not affected. It is preferably located between two layers of the antireflective coating, and/or is adjacent to a layer with a high refractive index of such antireflective coating. Preferably, the electrically conductive layer is located immediately under a layer having a low refractive index, most preferably is the penultimate layer of the antireflective coating by being preferably located immediately under a silica-based outer layer of the antireflective coating.

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer or a tin oxide layer.

The optical article of the invention is configured to reduce reflection in the UVA- and UVB-radiation range, in addition to reducing reflection in the visible region, so as to allow the best health protection against UV and harmful blue light.

In this regard, the optical article preferably comprises on its rear main face, and optionally on its front main face, an anti-UV, antireflective coating possessing very good antireflective performances in the visible region, and which is at the same time capable of significantly reducing the UV radiation reflection, especially ultraviolet A- and ultraviolet B-rays, as compared to a bare substrate or to a substrate comprising a traditional antireflective coating.

The mean reflection factor $R_{UV}$ on the rear main face between 280 nm and 380 nm, weighted by the function $W(\lambda)$ defined in the ISO 13666:1998 standard, is lower than 7%, preferably lower than 5%, more preferably lower than or equal to 4.5%, even better lower than or equal to 4% for an angle of incidence of 35° (on the rear face). In another embodiment, the mean reflection factor $R_{UV}$ on the rear main face between 280 nm and 380 nm, weighted by the function $W(\lambda)$ defined in the ISO 13666:1998 standard, is preferably lower than 5% for both an angle of incidence of 30° and for an angle of incidence of 45°. Said mean reflection factor RUV is defined through the following relation:

$$R_{UV} = \frac{\int_{280}^{380} W(\lambda) \cdot R(\lambda) \cdot d\lambda}{\int_{280}^{380} W(\lambda) \cdot d\lambda}$$

wherein $R(\lambda)$ represents the lens spectral reflection factor at a given wavelength, and $W(\lambda)$ represents a weighting function equal to the product of the solar spectrum irradiance $Es(\lambda)$ and the efficiency relative spectral function $S(\lambda)$. In certain embodiments, this factor may be measured at an angle of incidence that ranges from 30° to 45° on the rear face.

The spectral function $W(\lambda)$, enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy $Es(\lambda)$ into account, which does globally emit less UVB-rays as compared to UVA-rays, and the spectral efficiency $S(\lambda)$, UVB-rays being more harmful than UVA-rays. The values for those three functions in the ultraviolet region are given in the table disclosed at page 6 of the publication WO 2012/076714.

In some embodiments, the above anti-UV performances are provided by the antireflection coating while maintaining a Rv factor on the rear main face and/or on the front main face lower than or equal to 2.5%.

The optical article according to the invention may also comprise coatings formed on an antireflective coating and capable of modifying the surface properties thereof, such as hydrophobic and/or oleophobic coatings (antifouling top coat). These coatings are preferably deposited onto the outer layer of the antireflective coating. As a rule, their thickness is lower than or equal to 10 nm, does preferably range from 1 to 10 nm, more preferably from 1 to 5 nm. They are generally coatings of the fluorosilane or fluorosilazane type. They may be obtained by depositing a fluorosilane or fluorosilazane precursor, comprising preferably at least two hydrolysable groups per molecule. Fluorosilane precursors preferably comprise fluoropolyether moieties and more preferably perfluoropolyether moieties.

Optool DSX™, KY130™, OF210™, Aulon™ are examples of hydrophobic and/or oleophobic coatings. More detailed information on these coatings is disclosed in WO 2012076714.

Hereafter are features that can be combined with the specific features of the invention already described in the present application.

As it is will be shown in the examples, the optical lens according to the invention is suitable for different kind of optical lens: clear glasses and category 1, 2 or 3 sunglasses.

Thus, in one aspect of the invention, the optical lens is preferably category 3 sunglasses and comprises a relative light transmission factor in the visible spectrum Tv which is ranging from 8 to 18%, preferably from 15 to 18%.

According to this embodiment, the optical lens is further defined as having a ratio Qred/Qgreen which is ranging from 2.5 to 5.0 and the ratio Qblue/Qgreen which is ranging from 1.1 to 2.5 and Qgreen≥0.6.

According to this embodiment, the optical lens further comprises a polarizing film or an asymmetric interferential coating, which will be described hereafter.

In one another aspect of the invention, the optical lens is preferably category 2 sunglasses, and comprises a relative light transmission factor in the visible spectrum Tv which is ranging from 18% to 43%.

According to this embodiment, the optical lens further comprises a ratio $Q_{red}/Q_{green}$ which is ranging from 1.8 to 5.0, preferably from 1.9 to 4 and the ratio $Q_{blue}/Q_{green}$ is ranging from 1.0 to 2.0, preferably from 1.1 to 1.8 and $Q_{green} \geq 0.7$.

In one another aspect of the invention, the optical lens is preferably category 1 sunglasses, and comprises relative light transmission factor in the visible spectrum Tv is ranging from 43 to 80%, preferably from 60 to 70%.

According to this embodiment, the optical lens further comprises a ratio $Q_{red}/Q_{green}$ which is ranging from 1.0 to 2.0, preferably from 1.4 to 1.6 and a ratio $Qb_{lue}/Q_{green}$ which is ranging from 1.1 to 2.05, preferably from 1.2 to 1.5 and $Q_{green} \geq 0.9$.

A further object of the invention is the use of an optical lens such as defined above for correcting color vision for individuals with color vision deficiency, or for improving colour perception while driving.

The followings examples illustrate the present invention in a more detailed, but non-limiting manner.

EXAMPLES

1—Tested Lenses

TABLE 1

| Lens | Coloring dye | Substrate | Masking means |
|---|---|---|---|
| 1 | Orasol 363 | Polar Grey (S1) | Polar |
| 2 | Orasol 363 | Polar Grey (S1) | Polar and front side mirror |
| 3 | Heliotrop Lumacel R | Polar Grey (S1) | Polar |
| 4 | NFR | Polar Grey (S1) | Polar and front side mirror |
| 5 | Orasol 363 | Polar Brown (S2) | Polar |
| 6 | Heliotrop Lumacel R | Polar Brown (S2) | Polar |
| 7 | NFR | Polar Grey (S1) | Polar |
| 8 | Sulforhodamine B | White lens (S3) | None |
| 9 | Orasol 363 | White lens (S3) | None |
| 10 | Orasol 363 | White lens (S3) | Colour balancing (Yellow HLR) |
| 11 | Orasol 363 | White Lens (S3) | Asymmetric interferential stack |

Orasol 363 dye is supplied by BASF. Heliotrop Lumacel R is supplied by M. Dohmen. NFR is a red dye supplied by Huntsman. Yellow HLR is supplied by Sumika. Sulforhodamine B is obtained from Merck, and further purified.

2—Method of Preparation

Lenses from 1 to 7 use as making means a Polar film (see section 2.1 and 2.2 for details), and eventually a mirror on front side (Lenses 2 and 4). Lenses from 8 to 9 do not use masking means (see section 2.3 for details). Lens 10 use color balancing as masking means (see section 2.3 also for details). Lens 11 use asymmetric interferential stack as masking means (see section 2.4 for details).

The optical lenses used in the examples comprises either a lens substrate Xperio Polarized CR39 (Polar Grey S1) from ESSILOR, having a 65 mm diameter, a refractive index of 1.50, a power of −2.00 diopters and a thickness of 1.2 mm, or a lens substrate Xperio Polarized Polycarbonate (Polar Brown S2) from ESSILOR, having a 65 mm diameter, a refractive index of 1.50, a power of −2.00 diopters and a thickness of 1.2 mm, or a white lens ORMA (S3) from Essilor, having a 65 mm diameter, a refractive index of 1.50, a power of −2.00 diopters, a transmittance Tv around 92% and a thickness of 1.2 mm.

Especially, these S1, S2 and S3 substrates have a front face which is convex (CX) and a rear face which is concave (CC).

2.1: Polar and Epoxy Coating

In this section, the preparation of Lenses 1, 2 and 5 will be explained.

The epoxy coating consists in a solution composed of the following formulation:

TABLE 2

| N. | component | Chemical name | Lens 1 | Lens 2 | Lens 5 |
|---|---|---|---|---|---|
| 1 | Dye | Orasol363 BASF | 1.05 | 1.5 | 0.98 |
| 2 | Monomer | Cycloaliphatic di-epoxy | 28.1 | 28.1 | 28.1 |
| 3 | Solvant | Dowanol PM (1-methoxy-2-propanol) | 54.95 | 54.5 | 55.02 |
| 4 | Monomer | GE-60 (Sorbitol polyglycidyl ether) | 3.4 | 3.4 | 3.4 |
| 5 | Monomer | GE-30 (Trimethylolpropane triglycidyl ether) | 6.9 | 6.9 | 6.9 |
| 6 | Wetting agent | EFKA 3034 (Modified polysiloxane surfactant-supplier BASF) | 0.1 | 0.1 | 0.1 |
| 7 | Catalyst | NACURE SUPER XC-A218 (metal salt of triflic acid in n-butanol, supplier King Industries) | 5.5 | 5.5 | 5.5 |
| | Total | | 100 g | 100 g | 100 g |

The weight of dyes varies depending on the samples, which are desired. The weight of solvent (Dowanol) will be adjusted to have at the end 100 g of solution. According to the invention, the dye is first weighted and then components 2, 3, 4, 5, 6 are added and mixed together. At the end, component 7 is added (catalysts) and then the solution obtained is coated onto the lens substrate by spin-coating. The thickness of the coating after solvent evaporation is around 3 microns. After spinning, the coating is polymerized by putting the lens into an oven at 100° C. for 2-3 hours.

After the epoxy coating was applied and polymerized, a hard coat is added onto both sides of the lenses to improve their scratch resistance.

Also, an antireflective coating is coated in the backside of the lenses to avoid reflections (Crizal UV from Essilor)

In some cases, in order to improve aesthetics, such as in Lens 2 or Lens 4, on top of the hard coating and only on front side, a mirror coating is added. This mirror coating is a simple bi-layer mirror of $ZrO_2$ and $SiO_2$. The physical thicknesses are 50 nm and 21 nm respectively.

If no mirror coating is applied on front side, an antireflective coating is coated (Crizal Forte from Essilor).

2.2: Polar and Dip Tinting

In this section, the preparation of Lenses 3, 4, 6 and 7 will be explained.

The dip tinting process consists in using a water bath heated at temperature between 90 to 95° C. This water bath contains a constant proportion of dispersed dyes. Here, 15 g of dyes for 1 liter of water has been chosen. A dispersing agent has also been added to facilitate dyes dispersion. The intensity of the additional filtering properties will depend on the time that the lens is in the bath.

In the case of the sample Lens 3 and sample Lens 6, a violet dye from M. Dohmen (Heliotrop Lumacel R) has been used and the lens has been left inside the bath during 10 minutes.

In the case of sample Lens 4 and the sample Lens 7, a red dye from Huntsman (NFR) has been used and the lens has been left inside the batch during 55 minutes.

After dip tinting process, a hard coat has been applied onto both sides of the lenses to protect them from scratches. After hard coat, antireflection coating has also been applied on the backside and frontside of the lenses to avoid reflection. The hardcoat and the AR coating are the same as described above.

2.3: White Lens and Epoxy

In this section, the preparation of Lenses 8, 9 and 10 will be explained.

The epoxy coating consists in a solution composed of the following formulation

TABLE 3

| N. | component | Chemical name | Lens 8 | Lens 9 | Lens 10 |
|---|---|---|---|---|---|
| 1a | Dye | Orasol363 | | 0.38 | 0.41 |
| 1b | Dye | Yellow HLR | | | 0.30 |
| 1c | Dye | Sulforhodamine B | 1 | | |
| 2 | Monomer | Cycloaliphatic di-epoxy | 28.1 | 28.1 | 28.1 |
| 3 | Solvant | Dowanol PM (1-methoxy-2-propanol) | 55 | 55.62 | 55.29 |
| 4 | Monomer | GE-60 (Sorbitol polyglycidyl ether) | 3.4 | 3.4 | 3.4 |
| 5 | Monomer | GE-30 (Trimethylolpropane triglycidyl ether) | 6.9 | 6.9 | 6.9 |
| 6 | Wetting agent | EFKA 3034 (Modified polysiloxane surfactant-supplier BASF) | 0.1 | 0.1 | 0.1 |
| 7 | Catalyst | NACURE SUPER XC-A218 (metal salt of triflic acid in n-butanol, supplier King Industries) | 5.5 | 5.5 | 5.5 |
| | Total | | 100 g | 100 g | 100 g |

The method for preparation and application of epoxy coating is the same as in section 2.1.

2.4: White Lens and Asymmetric Interferential Stack

In this section, the preparation of Lenses 11a and 11b will be explained.

A white lens is prepared as Lens 9, except the fact that concentration of absorbing dye ORASOL 363 in the dried coating provides with a minimum transmittance of 12% at 570 nm wavelength. The coating is deposited by spin coating, heated for polymerization and has a final thickness of 3 μm Then, an interferential stack with the following structure is deposited on the front face, yielding sample Lens 11a.

TABLE 4

| Layer | Material White Lens + epoxy coating | Physical thickness (nm) |
|---|---|---|
| 1 | SiO | 11.8 |
| 2 | SiO$_2$ | 115.8 |
| 3 | Grey A | 30.8 |
| 4 | SiO$_2$ | 89.5 |
| | air | |

Or, an interferential stack with the following structure is deposited on the front face, yielding sample Lens 11b.

TABLE 5

| Layer | Material White Lens + epoxy coating | Physical thickness (nm) |
|---|---|---|
| 1 | Cr | 1.4 |
| 2 | SiO$_2$ | 102.2 |
| 3 | Cr | 3.9 |
| 4 | SiO$_2$ | 90.5 |
| | air | |

3—Test Procedure

Sample Lenses were mounted in frames and supplied to colourblind people and following tests were done:

Ishihara test is used to diagnosis dyschromatopsia. It is a book of 38 plates. Under a normalized D65 source, the observer has to recognize numbers within circles of dots randomized in color and size. Color deficiency is revealed when more than 8 plates are misread. The advantage of this test is to be easy and fast. Nevertheless, it does not give indication about global color shift, distortion or aesthetics.

Contrast Enhancement on Photographs is also used. For this test, observers were asked to observe photographs with the glasses to give a positive or negative feedback about color vision and judge contrast enhancement.

4—Results

Figure 1:
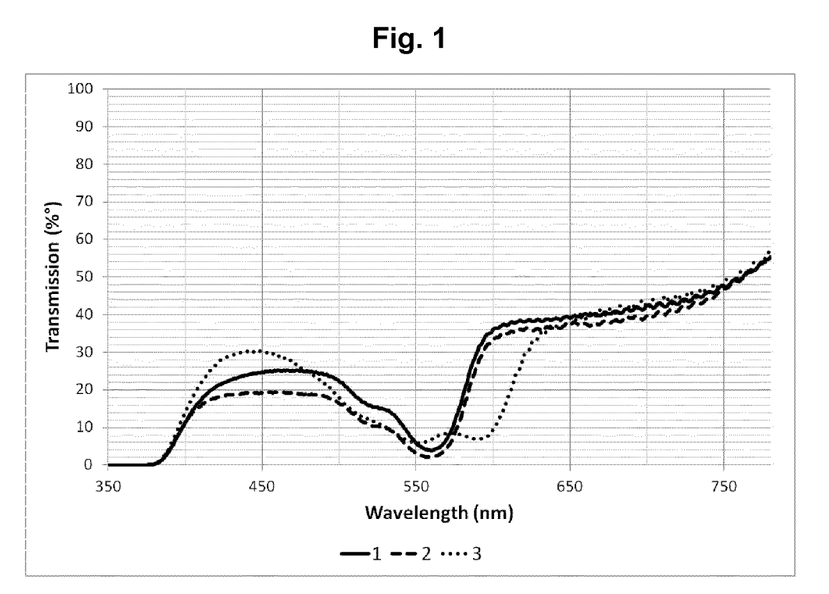
FIG. 1 shows the transmission (%) according to the wavelength in the visible region 380 to 780 nm of Lenses 1 to 3 according to the invention.
Figure 2:
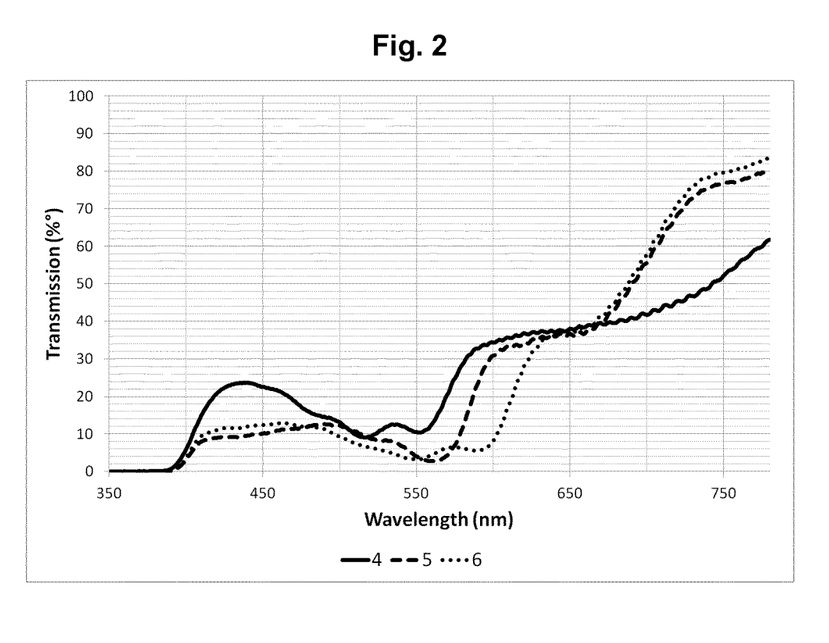
FIG. 2 shows the transmission (%) according to the wavelength in the visible region 380 to 780 nm of Lenses 4 to 6 according to the invention.
Figure 3:
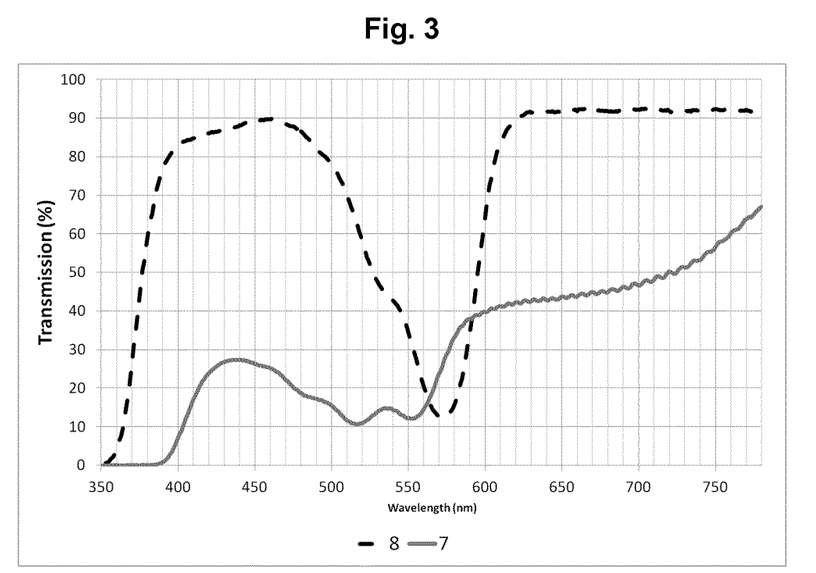
FIG. 3 shows the transmission (%) according to the wavelength in the visible region 380 to 780 nm of Lenses 7 and 8 according to the invention.
Figure 4:
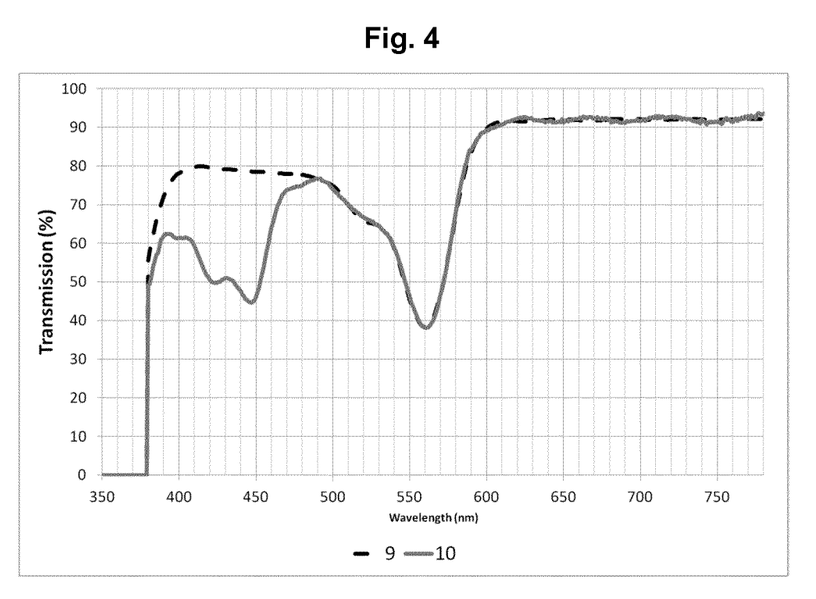
FIG. 4 shows the transmission (%) according to the wavelength in the visible region 380 to 780 nm of Lenses 9 and 10 according to the invention.
Figure 5:
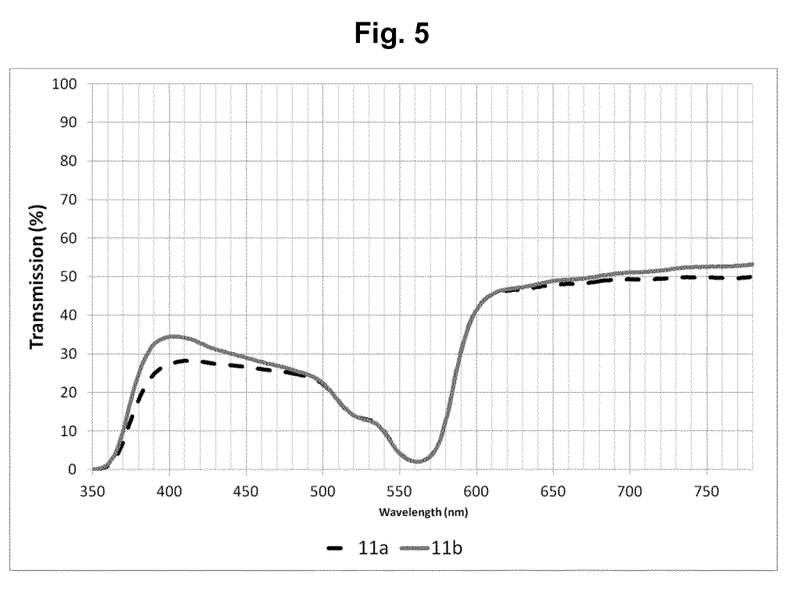
FIG. 5 shows the transmission (%) according to the wavelength in the visible region 380 to 780 nm of Lenses 11a and 11b according to the invention.

The transmission curves of these sample lenses are shown on FIG. 1, FIG. 2, FIG. 3, FIG. 4 and FIG. 5. Test performed by colourblind people and driving requirements are shown in Tables 6 and 7 below. In table 6, comparative examples corresponding to commercial products are also cited. In particular, the commercial products fail to improve colour perception, and don't meet the driving requirements.

As we can see from the experiments, optical lenses according to the invention are suitable either for spectacles lenses to be used indoor, with Tv above 60%, or for colored sunlenses, while being at the same time aesthetic and able to correct color visions for individuals with color vision deficiency. All tested lenses according to the invention have good results in the Ishihara's score. It means that colourblind observers were able to read at least one number that they could not see without lenses.

In addition, most of the tested lenses (All except Lens 2) comply with the driving constraints (Tmin should be ≥0.2*Tv, and Qratios for traffic lights) and are particularly suitable for drivers, even if not colourblind.

TABLE 6

| | Qred/ Qgreen | Qyellow/ Qgreen | Qblue/ Qgreen | Ishihara visibility | Contrast Enhancement on Photographs |
|---|---|---|---|---|---|
| Lenses 1 to 6 and 11 | >2.5 et <5 | >1.3 | >1.1 | Yes | Yes |

TABLE 6-continued

| | Qred/Qgreen | Qyellow/Qgreen | Qblue/Qgreen | Ishihara visibility | Contrast Enhancement on Photographs |
|---|---|---|---|---|---|
| Lenses 7 and 8 | ≥1.9 | ≥1.1 | ≥1.1 | Yes | Yes Sligth |
| Lenses 9 and 10 | ≥1.4 | ≥1.1 | ≥1.1 | Yes | Slight |

TABLE 7

| Lens | TvD65 (%) | Qred | Qyellow | Qgreen | Qblue | T min 475-650 | 0.2 Tv | QRed/QGreen | QYellow/QGreen | QBlue/QGreen |
|---|---|---|---|---|---|---|---|---|---|---|
| Driving requirements | | >0.8 | >0.6 | >0.6 | >0.4 | >0.2 TV | | | | |
| 1 | 18 | 2.03 | 1.29 | 0.77 | 1.1 | 3.9 | 3.67 | 2.6 | 1.7 | 1.4 |
| 2 | 15 | 2.36 | 1.33 | 0.63 | 1.05 | 2.12 | 2.95 | 3.7 | 2.1 | 1.7 |
| 3 | 12 | 2.07 | 1.13 | 0.79 | 1.49 | 5.78 | 2.48 | 2.6 | 1.4 | 1.9 |
| 4 | 20 | 1.84 | 1.40 | 0.70 | 0.83 | 9.00 | 3.93 | 2.6 | 2.0 | 1.2 |
| 5 | 14 | 2.37 | 1.45 | 0.68 | 1.00 | 3.80 | 2.85 | 3.5 | 2.1 | 1.5 |
| 6 | 9 | 2.72 | 1.47 | 0.69 | 1.29 | 3.19 | 1.76 | 3.9 | 2.1 | 1.9 |
| 7 | 23 | 1.82 | 1.39 | 0.71 | 0.83 | 10.59 | 4.57 | 2.6 | 2.0 | 1.2 |
| 8 | 48 | 1.67 | 1 | 0.88 | 1.45 | 12.35 | 9.65 | 1.90 | 1.14 | 1.15 |
| 9 | 65.9 | 1.37 | 1.09 | 0.92 | 1.07 | 38.31 | 13.18 | 1.5 | 1.2 | 1.2 |
| 10 | 65.56 | 1.38 | 1.07 | 0.9 | 1.04 | 38.06 | 13.11 | 1.5 | 1.2 | 1.2 |
| 11a | 18.25 | 2.42 | 1.31 | 0.64 | 1.12 | 2.10 | 3.65 | 3.81 | 2.06 | 1.76 |
| 11b | 18.29 | 2.44 | 1.31 | 0.63 | 1.15 | 2.04 | 3.66 | 3.86 | 2.07 | 1.82 |
| Enchroma CX-14 | 14 | 1.43 | 0.94 | 1.13 | 1.02 | −0.01 | 2.87 | 1.3 | 0.8 | 0.9 |
| Enchroma Mineral Cx | 10 | 1.13 | 0.89 | 1.15 | 0.86 | −0.04 | 2.04 | 1.0 | 0.8 | 0.7 |
| Enchroma CX-25 | 22 | 1.35 | 0.95 | 1.11 | 1.06 | 0.03 | 4.40 | 1.2 | 0.9 | 1.0 |

The invention claimed is:

1. An optical lens comprising a substrate and a filtering means which has at least a minimum light transmission factor "Tmin (515-580)" in the visible spectrum at a wavelength ranging from 515 nm to 580 nm that is lower than or equal to 40%, said optical lens having the following transmission characteristics in the visible spectrum ranging from 380 to 700 nm:
  the transmission curve has a negative relative slope on the wavelength ranging from 485 to 515 nm and absolute value of said relative slope is larger than $4 \cdot 10^{-3}$ nm$^{-1}$;
  the transmission curve has a positive relative slope on the wavelength ranging from 580 to 610 nm and value of said relative slope is larger than $4 \cdot 10^{-3}$ nm$^{-1}$;
  an average transmission on the range from 435 to 485 nm which is larger than 5% and larger than the T515-580, T515-580 being the average transmission over the range from 515 nm to 580 nm;
  an average transmission on the range from 610 to 700 nm which is larger than T515-580; and
  an average transmission on the range from 515 to 580 nm which is lower than (T500+T595)/2, T500 being the transmission at 500 nm T595 being the transmission at 595 nm.

2. The optical lens according to claim 1, wherein the transmission curve has a negative relative slope on the wavelength ranging from 485 to 515 nm and absolute value of said relative slope is larger than $6.6 \cdot 10^{-3}$ nm$^{-1}$.

3. The optical lens according to claim 2, wherein the transmission curve has a negative relative slope on the wavelength ranging from 485 to 515 nm and absolute value of said relative slope is larger than $8.2 \cdot 10^{-3}$ nm$^{-1}$.

4. The optical lens according to claim 1, wherein the transmission curve has a positive relative slope on the wavelength ranging from 580 to 610 nm and value of said relative slope is larger than $6 \cdot 10^{-3}$ nm$^{-1}$.

5. The optical lens according to claim 1, further defined as having a Qblue/Qgreen as described in the Q values according to the standard ISO 13666-2013 which is higher than 1.1.

6. The optical lens according to claim 1, further defined as having a Qred/Qgreen as described in the Q values according to the standard ISO 13666-2013 which is higher than 1.4.

7. The optical lens according to claim 6, further defined as having a Qred/Qgreen as described in the Q values according to the standard ISO 13666-2013 which is higher than 1.5.

8. The optical lens according to claim 7, further defined as having a Qred/Qgreen as described in the Q values according to the standard ISO 13666-2013 which is higher than 2.5.

9. The optical lens according to claim 1, wherein said filtering means has a minimum light transmission factor in the visible spectrum at a wavelength ranging from 515 to 580 nm Tmin (515-580) which is lower or equal to 30%.

10. The optical lens according to claim 9, wherein said filtering means has a minimum light transmission factor in the visible spectrum at a wavelength ranging from 515 to 580 nm Tmin (515-580) which is lower or equal to 20%.

11. The optical lens according to claim 1, further comprising at least one color balancing component.

12. The optical lens according to claim 1, further comprising at least one broadband absorbing layer in the overall visible spectrum, so as to decrease transmission in the overall visible spectrum.

13. The optical lens according to claim 1, wherein the relative light transmission factor in the visible spectrum Tv is ranging from 8% to 18%.

14. The optical lens according to claim 13, further wherein the ratio Qred/Qgreen is ranging from 2.5 to 5.0 and the ratio Qblue/Qgreen is ranging from 1.1 to 2.5 and Qgreen≥0.6.

15. The optical lens according to claim 13, further comprising a polarizing film or an asymmetric interferential coating.

16. The optical lens according to claim 1, wherein the relative light transmission factor in the visible spectrum Tv is ranging from 18% to 43%.

17. The optical lens according to claim 16, wherein the ratio Qred/Qgreen is ranging from 1.8 to 5.0 and the ratio Qblue/Qgreen is ranging from 1.0 to 2.0 and Qgreen≥0.7.

18. The optical lens according to claim 17, wherein the ratio Qred/Qgreen is ranging from 1.9 to 4 and the ratio Qblue/Qgreen is ranging from 1.1 to 1.8 and Qgreen≥0.7.

19. The optical lens according to claim 1, wherein the relative light transmission factor in the visible spectrum Tv is ranging from 43% to 80%.

20. The optical lens according to claim 19, further wherein the ratio Qred/Qgreen is ranging from 1.0 to 2.0 and the ratio Qblue/Qgreen is ranging from 1.1 to 2.05 and Qgreen≥0.9.

21. The optical lens according to claim 20, further wherein the ratio Qred/Qgreen is ranging from 1.4 to 1.6 and the ratio Qblue/Qgreen is ranging from 1.2 to 1.5 and Qgreen≥0.9.

22. The optical lens according claim 1, wherein said optical lens is eyeglasses, especially sunglasses.

23. A method for correcting colour vision for individuals with colour vision deficiency, or for improving colour perception while driving comprising the use of an optical lens according to claim 1.

* * * * *